(12) United States Patent
Liang et al.

(10) Patent No.: US 6,560,586 B1
(45) Date of Patent: May 6, 2003

(54) MULTIRESOLUTION LEARNING PARADIGM AND SIGNAL PREDICTION

(75) Inventors: Yao Liang, Raleigh, NC (US); Edward W. Page, Seneca, SC (US)

(73) Assignee: Alcatel, Paris (FR)

(*) Notice: Subject to any disclaimer, the term of this patent is extended or adjusted under 35 U.S.C. 154(b) by 0 days.

(21) Appl. No.: 09/429,365

(22) Filed: Oct. 28, 1999

Related U.S. Application Data (60) Provisional application No. 60/106,317, filed on Oct. 30, 1998.

(51) Int. Cl.$^7$ .............................. G06F 15/18; G06N 3/08
(52) U.S. Cl. ...................................................... 706/25
(58) Field of Search ........................... 706/15, 25, 20

(56) References Cited

U.S. PATENT DOCUMENTS 5,621,861 A    4/1997  Hayashi et al. ............... 706/25

6,285,992 B1 * 9/2001 Kwasny et al. ............... 706/15

OTHER PUBLICATIONS

Wing–Chung Chan et al; Transformation of Back–Propagation Networks in Multiresolution Learning; 1994; IEEE; INSPEC 4903733; 290–294.*

* cited by examiner

*Primary Examiner*—John A. Follansbee
*Assistant Examiner*—Joseph P. Hirl
(74) *Attorney, Agent, or Firm*—Sughrue Mion, PLLC

(57) ABSTRACT

A neural network learning process provides a trained network that has good generalization ability for even highly nonlinear dynamic systems, and is trained with approximations of a signal obtained, each at a different respective resolution, using wavelet transformation. Approximations are used in order from low to high. The trained neural network is used to predict values. In a preferred embodiment of the invention, the trained neural network is used in predicting network traffic patterns.

15 Claims, 6 Drawing Sheets

Decomposition

Reconstruction

Fig. 1

(a) Training data $r_m$ (b) Training data $r_{m-1}$ (c) Training data $r_{m-2}$

MULTIRESOLUTION LEARNING PARADIGM AND SIGNAL PREDICTION

CROSS REFERENCE TO RELATED APPLICATIONS.

This application claims the benefit of U.S. Provisional Application No. 60/106,317, filed Oct. 30, 1998. The Provisional Application No. 60/106,317 is hereby incorporated by reference in its entirety for all purposes.

BACKGROUND OF THE INVENTION

1. Field of the Invention

This invention relates to a learning process for a neural network.

2. Background Books and Articles

The following books and articles are useful items for understanding the technical background of this invention, and each item is incorporated in its entirety by reference for its useful background information. Each item has an item identifier which is used in the discussions below.

i. B. L. Bowerman and R. T. O'Connell, *Time Series Forecasting*, New York: PWS, 1987.

i. G. E. P. Box and G. M. Jenkins, *Time Series Analysis, Forecasting, and Control*, San Francisco, Calif.: Holden-Day, 1976.

iii. A. Cichocki and R. Umbehauen, Neural Networks for Optimization and Signal Processing, New York: Wiley, 1993.

iv. A. S. Weigend and N. A. Gershenfeld, Eds., *Time Series prediction: Forecasting the Future and Understanding the Past,* Reading, Mass.: Addison-Wesley, 1994.

v. A. Lepedes and R. Farber, "Nonlinear signal processing using neural network: Prediction and System Modeling," Los Alamos Nat. Lab. Tech. Rep. LA-UR 87-2662, 1987.

vi. K. Hornik, "Approximation Capability of Multilayer Feedforward Networks," *Neural Networks,* vol. 4, 1991.

vii. M. Leshno, V. Y. Lin A. Pinkus and S. Schocken. "Multilayer feedforward networks with a nonpolynomial activation function can approximate any function," *Neural Networks,* vol. 6, pp. 861–867, 1993.

viii. S. G. Mallat, "A Theory for Multiresolution Signal Decomposition: the wavelet Representation," *IEEE Trans, Pattern Anal. Machine Intell.,* vol. 11, pp. 674–693, July 1989.

ix. E. B. Baum and D. Haussler, "What Size Net Gives Valid Generalization," *Neural Comput.,* vol. 1, pp. 151–160, 1989.

x. S. German, E. Bienenstock and R. Doursat, "Neural Networks and the Bias/Variance Dilemma," *Neural Comput.,* vol. 4, pp. 1–58, 1992.

xi. K. J. Lang, A. H. Waibel, and G. E. Hinton, "A time— delay neural network architecture for isolated word recognition," *Neural Networks,,* vol. 3, pp. 23–43, 1990.

xii. Y. LeCun. "Generalization and network design strategies," Univ. Toronto, Toronto, Ont., Canada, Tech. Rep. CRG-TR-89-4, 1989.

xiii. E. A. Wan, "Time Series Prediction by Using a Connectionist Network With Internal Delay Lines," Time Series Prediction: *Forecasting the Future and Understanding the Past.* Reading, Mass.: Addison-Wesley, 1994, pp. 195–218 xiv. D. C. Plaut, S. J. Nowlan, and G. E. Hinton, "Experiments on Learning by BackPropagation," Carnegie Mellon Univ., Pittsburgh, Pa. Tech. Rep., CMU-CS-86-126, 1986.

xv. A. Krogh and J. A. Hertz, "A Simple Weight Decay Can Improve Generalization," *Adv., Neural Inform. Process. Syst.,* vol. 4. pp. 950–957.

xvi. A. S. Weigend, D. E. Rumelhart, and B. A. Huberman, "Back-propagation, weight-elimination and time series prediction," In *Proc. Connenectionist Models Summer Sch.,* 1990, pp. 105–116.

xvii. A. S. Weigend, B. A. Huberman, and D. E. Rumelhart, "Predicting the Future: A Connectionist Approach," *Int. J. Neural Syst.,* vol. 1. no. 3. pp. 193–209, 1990.

xviii. M. Cottrell, B. Girard, Y. Girard, M. Mangeas, and C. Muller, "Neural Modeling for Time Series: A Statistical Stepwise Method for Weight Elimination," *IEEE Trans. Neural Networks.,* vol. 6. pp. 1355–1364. November 1995.

xix. R. Reed. "Pruning Algorithms—A Survey," *IEEE Trans. Neural Networks,* vol. 4, pp. 740–747, 1993.

xx. M. B. Priestley, Non-Linear and Non-Stationary Time Series Analysis, New York; Academic, 1988.

xxi. Y. R. Park, T. J. Murray, and C. Chen, "Predicting Sun Spots Using a Layered perception Neural Netowrk," *IEEE Trans. Neural Networks,* Vol. 7, pp. 501–505, March 1996.

xxii. W. E. Leland and D. V. Wilson. "High Time-resolution Measurement and Analysis of Ian Traffic: Implications for Ian Interconnection," in Proc. *IEEE INFOCOM,* 1991, PP. 1360–1366.

xxiii. W. E. Leland, M. S. Taqqu. W. Willinger and D. V. Wilson, "On the Self-Similar Nature of Ethernet Traffic," in *Proc. ACM SIGCOMM,* 1993, pp. 183–192.

xxiv. W. E. Leland, M. S. Taqqu, W. Willinger and D. V. Wilson. "On the Self Similar Nature of Ethernet Traffic (Extended Version)," *IEE/ACM Trans. Networking,* Vol. 2, pp. 1–15, Febuary 1994.

Related Work

Traditional time-series forecasting techniques can be represented as autoregressive integrated moving average models (see items i and ii, above). The traditional models can provide good results when the dynamic system under investigation is linear or nearly linear. However, for cases in which the system dynamics are highly nonlinear, the performance of traditional models might be very poor (see items iii and iv, above). Neural networks have demonstrated great potential for time-series prediction. Lepedes and Farber (see item v) first proposed using multilayer feedforward neural networks for nonlinear signal prediction in 1987. Since then, research examining the approximation capabilities of multilayer feedforward neural networks (see items vi and vii) has justified their use for nonlinear time-series forecasting and has resulted in the rapid development of neural network models for signal prediction.

A major challenge in neural network learning is to ensure that trained networks possess good generation ability, i.e., they can generalize well to cases that were not included in the training set. Some research results have suggested that, in order to get good generalization, the training set should form a substantial subset of the sample space (see ix and x). However, obtaining a sufficiently large training set is often impossible in many practical real-world problems where there are only a relatively small number of samples available for training.

Recent approaches to improving generalization attempt to reduce the number of free weight parameters in the network. One approach is weight sharing as employed in certain time-delay neural networks (TDNN's) (see xi and xii) and finite impulse (FIR) networks (see xiii). However, this approach usually requires that the nature of the problem be well understood so that designers know how weights should be shared. Yet another approach is to start network training using an excessive number of weights and then remove the excess weights during training. This approach leads to a family of pruning algorithms including weight decay (see xv), weight-elimination (see xvi and xvii), and the statistical step-wise method (SSM, see xviii). For a survey of pruning techniques, see item xix. While pruning techniques might offer some benefit, this approach remains inadequate for difficult learning problems. As mentioned in item xix, for example, it is difficult to handle multi-step prediction with the statistical stepwise method.

There is therefore a need for a neural network learning process that gives a trained network possessing good generalization ability so as to provide good results even when the dynamic system under investigation is highly nonlinear.

SUMMARY OF THE INVENTION.

It is the object of this invention to provide a neural network learning process that provides a trained network that has good generalization ability for even highly nonlinear dynamic systems. In one embodiment, the objective is realized in a method of predicting a value for a series of values. According to this method, several approximations of a signal are obtained, each at a different respective resolution, using the wavelet transformation. Then, a neural network is trained using, successively, the approximations in order beginning with the lowest resolution approximation and continuing up through the higher resolution approximations. The trained neural network is used to predict values, and has good generalization even for highly nonlinear dynamic systems. In a preferred embodiment of the invention, the trained neural network is used in predicting network traffic patterns.

BRIEF DESCRIPTION OF THE DRAWING FIGURES.

The objects, advantages, and features of the invention will be more readily understood with reference to the detailed discussion of various embodiments, below, taken in conjunction with the enclosed drawing figures.

DETAILED DESCRIPTION OF THE PREFERRED EMBODIMENTS.

A detailed description of a preferred embodiment will now be provided so as to illustrate the concepts and ideas of the invention. The description of this preferred embodiment is provided by way of explanation only, and the extent and scope of the invention is to be interpreted not only based on this preferred embodiment, but in accordance with the claims included herewith.

This new learning concept and paradigm may be referred to as "multiresolution learning", and it significantly improves the generalization ability of neural networks and, therefore, improves their effectiveness on difficult signal prediction problems. To demonstrate the efficacy of multiresolution learning, the benchmark sunspot series as well as the more challenging problem of real-world, high-speed network traffic prediction are investigated.

Wavelet Representation of Signals

Wavelet theory provides a mathematical tool for hierarchically decomposing signals and, hence, an elegant technique for representing signals at multiple levels of detail. This section will briefly review multiresolution analysis in wavelet theory and the discrete wavelet transform that will provide the mathematical background for the multiresolution learning paradigm.

The Basic Idea

Multiresolution analysis (see item viii, above) permits the approximation of a signal f at different resolutions. Let R and Z denote the sets of reals and integers, respectively. Let $L^2(R)$ denote the vector space of square-integrable, one dimensional (1-D) functions $f(x)$ and let $V_j (j \epsilon Z)$ denote a closed subspace in $L^2(R)$. Each subspace $V_j$ contains the approximation of all functions $f(x)$ at resolution $2^j$. The approximation of a signal at resolution $2^{j+1}$ contains all the information necessary to compute the signal at the lower resolution $2^j$. Thus, $V_j 532 V_{j+1}$, which implies a nested set of vector subspaces $$\ldots \subset V_{-2} \subset V_{-1} \subset V_0 \subset V_1 \subset V_2 \subset \ldots \qquad \text{Equation 1}$$

The successive approximation subspaces $V_j$ can be characterized by means of a scaling function $\phi \epsilon L^2(R)$. Assume that the integer translates of $\phi$ are an orthonormal basis for the space $V_0$, which is defined to be the approximation space with resolution 1. The approximation spaces $V_j$ with resolution $2^j$ are then built from basis functions that are dilations and translations of the scaling function o so that for $j, n \epsilon Z$, the set of functions $$\phi_{j,n}(x) = 2^{j/2} \phi(2^j x - n) \qquad \text{Equation 2}$$

is an orthonormal basis for $V_j$.

When computing the approximations of a signal f at resolution $2^j$, some information about f is lost. As the resolution increases to $+\infty$, the approximated signal converges to the original signal. However, when the resolution decreases to zero, the approximated signal has increasingly less information and will converge to zero. Thus, if $P_j$ denotes the orthogonal projection operator from $L^2(R)$ onto $V_j$ $$\lim_{j \to +\infty} P_j f = f \qquad \text{Equation 3}$$

$$\lim_{j \to -\infty} P_j f = 0 \qquad \text{Equation 4}$$

There is some difference in information about f between the approximation $P_{j+1} f$ at resolution $2^{j+1}$ and the approximation $P_j f$ at resolution $2^j$. This difference is the signal detail needed to reconstruct the approximation at resolution $2^{j+1}$ which is given by the orthogonal projection of the original signal onto the orthogonal complement of $V_j$ in $V_{j+1}$. Let $W_j$ denote this orthogonal complement. Then $$V_{j+1} = V_j \oplus W_j \qquad \text{Equation 5}$$

Orthonormal bases for $W_j$ are formed by dilations and translations of a prototype function $\psi(x)$ called a wavelet, which is related to φ(x). The family of wavelet basis functions is defined for j,n∈Z as $$\psi_{j,n}(x) = 2^{j/2}\psi(2^j x - n) \quad \text{Equation 6}$$

Let $Q_j$ denote the orthogonal projection operator from $L^2(R)$ onto $W_j$. Then $$P_{j+1}f = P_j f + Q_j f \quad \text{Equation 7}$$

Therefore, any approximation of signal $f \in L^2(R)$ at resolution $2^{j+1}$ can be decomposed into a "blurred" version of the signal at resolution $2^j$ plus signal detail at resolution $2^j$. By recursive application of Equation 7:

$$P_m f = P_M f + \sum_{j=M}^{m-1} Q_j f \quad \text{Equation 8}$$

where m,M∈Z, and M<m.

In practice, any signal f can be approximated only as a sampled version $f^m = P_{mf} \in V_m$ for some m∈Z. Thus, $$f^m = P_M f^m + \sum_{j=M}^{m-1} Q_j f^m \quad \text{Equation 9}$$

In Equation 9, $P_M f^m$ is the projection of a discrete-time signal $f^m$ at the lowest resolution of interest (j=M), and $Q_j f^m$ is the signal detail needed to reconstruct $P_{j+1} f^m$ from $P_j f^m$.

Filter Banks

Mallat (see item viii) introduced a tree algorithm for computing wavelet transforms by using the wavelet coefficients as filter coefficients. For decomposition, the tree algorithm employs a lowpass filter L and a highpass filter H. Assume that $s^m$ is a vector of length n representing a sampled version of a signal f at the finest resolution $2^m$. A lowpass filter L is used to produce the coarse approximation $s^{m-1}$ at resolution $2^{m-1}$, which is a vector with half as many entries as $s^m$. This process can be iterated on $s^{m-1}$ to produce $s^{m-2}$. Thus $$s^{j-1} = L s^j, \quad j = 1, 2, \ldots, m. \quad \text{Equation 10}$$

The detail signal $d_j$ at resolution $2^j$ is obtained by applying a highpass filter H to $s^j$. That is $$d^{j-1} = H s^j, \quad j = 1, 2, \ldots, m. \quad \text{Equation 11}$$

The lowpass and highpass filters are called analysis filters.

To reconstruct the original sampled signal $s^m$, two synthesis filters L* and H* (the transposed matrices of L and H, respectively) are used. The reconstruction is given by $$s^j = L^* s^{j-1} + H^* d^{j-1}, \quad j = 1, 2, \ldots, m. \quad \text{Equation 12}$$

Therefore, any original signal f can be represented as $$f = s^m = s^0 + d^0 + d^1 + \ldots + d^{m-2} + d^{m-1}. \quad \text{Equation 13}$$

Figure 1:
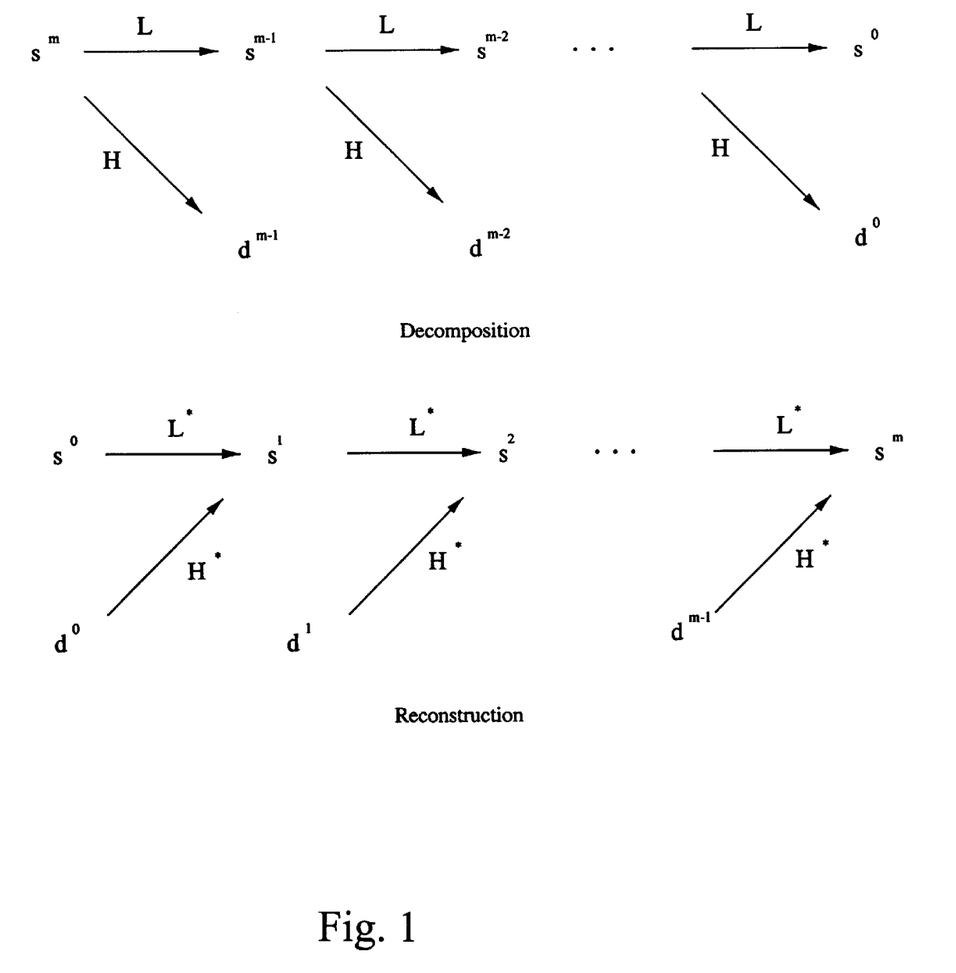
FIG. 1 illustrates a tree algorithm for the decomposition and reconstruction of a signal using wavelet transforms.

The tree algorithm for the decomposition and reconstruction process is illustrated in FIG. 1.

Multiresolution Learning Paradigm

Multiresolution Learning

The multiresolution analysis framework in wavelet theory is employed for decomposing a signal and approximating it at different levels of detail. Unlike traditional neural network learning which employs a single signal representation for the entire training process, multiresolution learning exploits the approximation sequence representation-by-representation from the coarsest version to finest version during the neural network training process.

Assume that a given sampled signal $s^m$ is to be learned. Let m, M∈Z and 0<M<m. Let a learning activity $A_j(r_j)$ denote a specific training phase conducted on the representation $r_j$ of training data (which may include some form of preprocessing) with any given learning algorithm. Let "→" be the learning dependency operator by which $A_j \rightarrow A_i$ means that the learning activity $A_j$ should be conducted before the learning activity $A_i$. Multiresolution learning then can be defined as a sequence of learning activities $\{A_j(r_j)\}_{j \in Z, j \geq M}$ associated with the sequence of approximation subspaces $\{V_j\}$ in multiresolution analysis such that the following requirements are satisfied.

(1) The representation $r_j$ is associated with the approximation $s^j$ of the original signal $s^m$ in the approximation subspace $V_j$;

(2) $A_j(r_j) \rightarrow A_{j+1}(r_{j+1})$.

From this definition, it can be seen that the multiresolution learning paradigm generates an ordered sequence of learning activities as $$A_M(r_M) \rightarrow A_{M+1}(r_{M+1}) \rightarrow \ldots A_m(r_m) \quad \text{Equation 14}$$

where the parameter M indicates the approximation level of the original signal $s^m$ used to initiate the learning process. The first learning activity $A_M(r_M)$ starts with randomly initialized network weights, and each subsequent learning activity $A_j(r_j)_{j>M}$ starts with the connection weights resulting from the previous learning activity.

The approximation $s^j (j<m)$ will contain fewer signal samples than the original signal $s^m$. However, the training vectors in each learning activity $A_j$ should occupy the full dimension of the neural network inputs in $V_m$ to guarantee the smooth transition between subsequent learning activities. Therefore, a method is needed for constructing the representation $r_j$ of training data for $A_j$ based on $s^j$. This is achieved by setting the signal details $d_k(k > j)$ to zero and reconstructing $s^j$ in $V_m$.

Discussion

It is interesting to examine the underlying idea of the multiresolution learning paradigm. Since $r_M$ for the first learning activity $A_M$ is a much simplified version of the original sampled signal $s^m$, $r_M$ is more easily learned than $s^m$. Following learning activity $A_j$, a small information increment (which is represented as detail signal $d^j$) between $r_j$ and $r_{j+1}$ is successively added from $A_j(r_j)$ to $A_{j+1}(r_{j+1})$, thus requiring the network to learn only the incremental detail $d^j$ between learning activities. Therefore, by decomposing $s^m$ as $s^m = s^M + d^M + d^{M+1} + \ldots + d^{m-2} + d^{m-1}$, multiresolution learning approaches the more difficult problem of learning $s^m$ by starting from a much simplified version of $s^m$, successively adding details to the learning process, and successively refining the neural network's learning behavior.

Each approximation $s^j$ of $s^m$ can potentially reveal the internal correlation structure at resolution level j that may be obscured in the original signal $s^m$. How well a network learns the internal correlation structure influences the degree of generalization the network can attain. When the internal correlation structure is explicitly exposed to the neural network in terms of $r_j$, it can be more easily captured and learned.

From the discussion above, it is evident that the conventional neural network learning process, regardless of the learning algorithm and preprocessing used, is simply a single-resolution or single-representation learning activity A(r). From this insight, it is not difficult to understand why conventional neural network learning cannot always learn difficult time series well, and consequently, the resulting neural networks often do not generalize well.

Sunspot Series Prediction

Sunspot series prediction is a benchmark time-series forecasting problem frequently studied by time-series analysts (see item xx, above) and has also been investigated by several neural network researchers (items xvi, xvii, xviii, and xxi). Sunspots are dark blotches on the sun, and yearly averages of sunspots have been recorded since 1700. Previously published results have employed sunspot data between the years 1700 and 1920 to model the series and have used data from 1921 and 1979 to evaluate forecasting performance.

Weigend et al. (see items xvi and xvii) investigated sunspot series prediction using a 12-3-1 feedforward neural network and the backpropagation algorithm with weight elimination. Here, the commonly used notation 12-3-1 denotes a three-layered network having 12 input nodes, three neurons in the hidden layer, and a single output neuron. The hidden-layer neurons employed a conventional sigmoid activation function; however, the output neuron employed a linear activation function as frequently used in forecasting applications. Weigend et al. demonstrated that neural networks can significantly outperform the best conventional forecasting model in iterated multistep prediction.

In order to compare the results using the multiresolution learning paradigm with those obtained by other approaches, the normalized mean squared error (NMSE, see item iv) is used to assess forecasting performance. The NMSE is computed as $$NMSE = \frac{1}{\sigma^2} \frac{1}{N} \sum [x(t) - \hat{x}(t)]^2 \qquad \text{Equation 15}$$

where x(t) is the observed value of the time series at time t;

$\hat{x}(t)$ is the predicted value of x(t); and $\sigma^2$ is the variance of the time series over the prediction duration.

Thus, a value of NMSE=1 corresponds to predicting the estimated mean of the data.

Multiresolution Learning for Sunspot Series

Following the multiresolution learning paradigm, the sunspot data to be learned $s^m$ is the observed data from 1700 to 1920. The data set was scaled to the range of {−0.95, 2.85} with zero mean. In this experiment, M is chosen as m−2, and $s^m$ is decomposed as $$s^m = s^{m-2} + d^{m-2} + d^{m-1} \qquad \text{Equation 16}$$

From this decomposition two approximations $s^{m-2}$ and $s^{m-1} = s^{m-2} + d^{m-2}$ of the original data are obtained. The corresponding multiresolution learning process for the sunspot series then will contain three learning activities: $A_{m-2}(r_{m-2})$, $A_{m-1}(r_{m-1})$, and $A_m(r_m)$. For this experiment the Haar wavelet was employed to decompose $s^m$ into the approximations $s^{m-1}$ and $s^{m-2}$. Thus, $$r_j = \begin{cases} s^j: & j = m \\ s^j + \sum_{k=j}^{m-1} d^k: & d^k = 0; \quad j = m-2, m-1 \end{cases} \qquad \text{Equation 17}$$

The neural network employed was identical to the 12-3-1 network structure used by Weigend et al. (see items xvi and xvii, above). According to the multiresolution learning paradigm, the neural network training process is $$A_{m-2}(r_{m-2}) \rightarrow A_{m-1}(r_{m-1}) \rightarrow A_m(r_m) \qquad \text{Equation 18}$$

Figure 2:
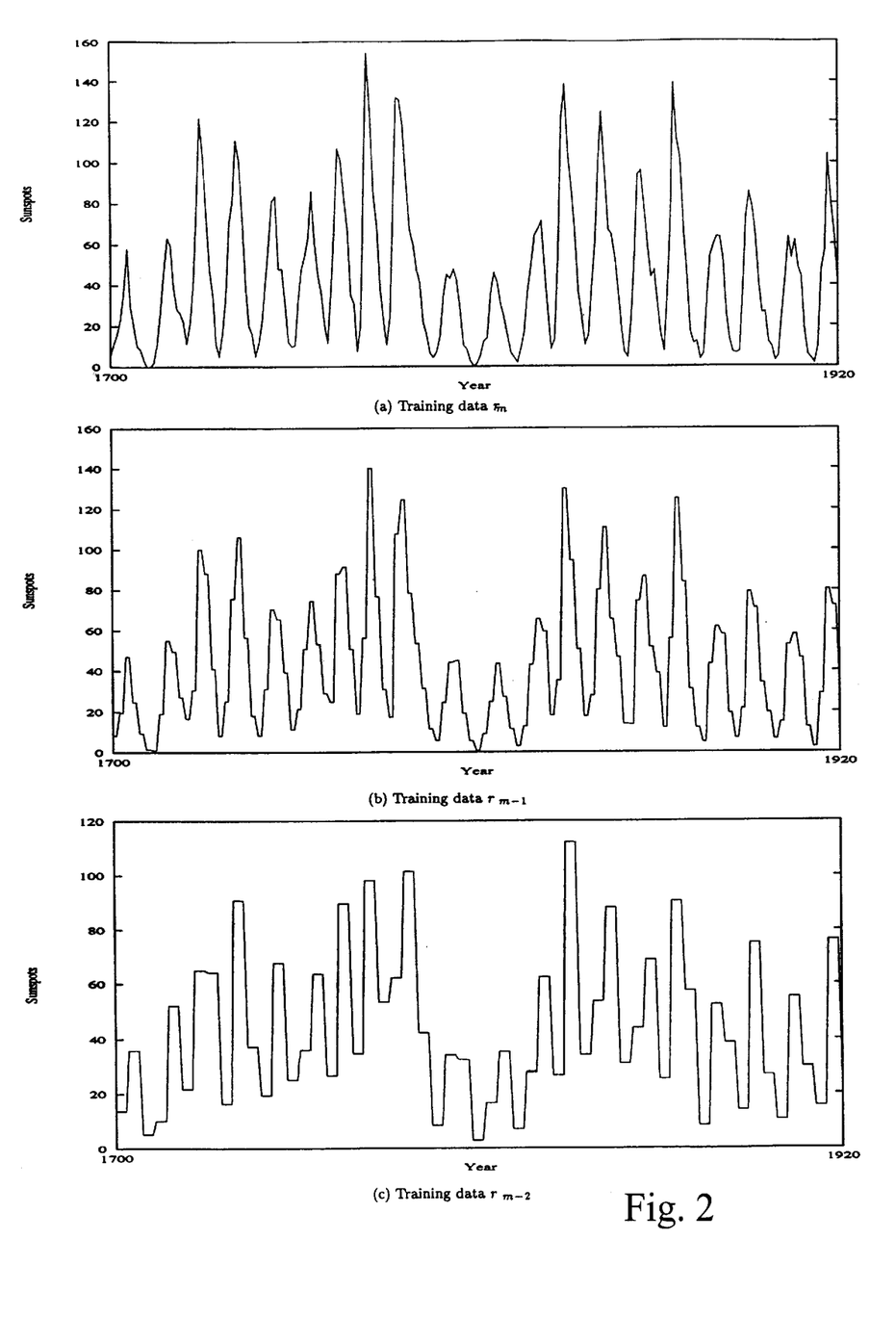
FIG. 2 shows training data used in learning activities in an embodiment according to the invention.

Each of the three learning activities $A_{m-2}(r_{m-2})$, $A_{m-1}(r_{m-1})$, and $A_m(r_m)$ was conducted for 1000 iterations of the training data using the backpropagation algorithm. The learning rate was 0.01, and no momentum term was used. FIG. 2 shows the sunspot training data used for the three learning activities.

Iterated Multistep Prediction

A neural network trained for single-step forecasting can forecast multiple steps into the future by using the predicted output for a given step as an input for computing the time series at the next step, and all other network inputs are shifted back one time unit. Thus, as the iterated multistep forecasting process proceeds, the network inputs will eventually consist entirely of predicted values.

Figure 3:
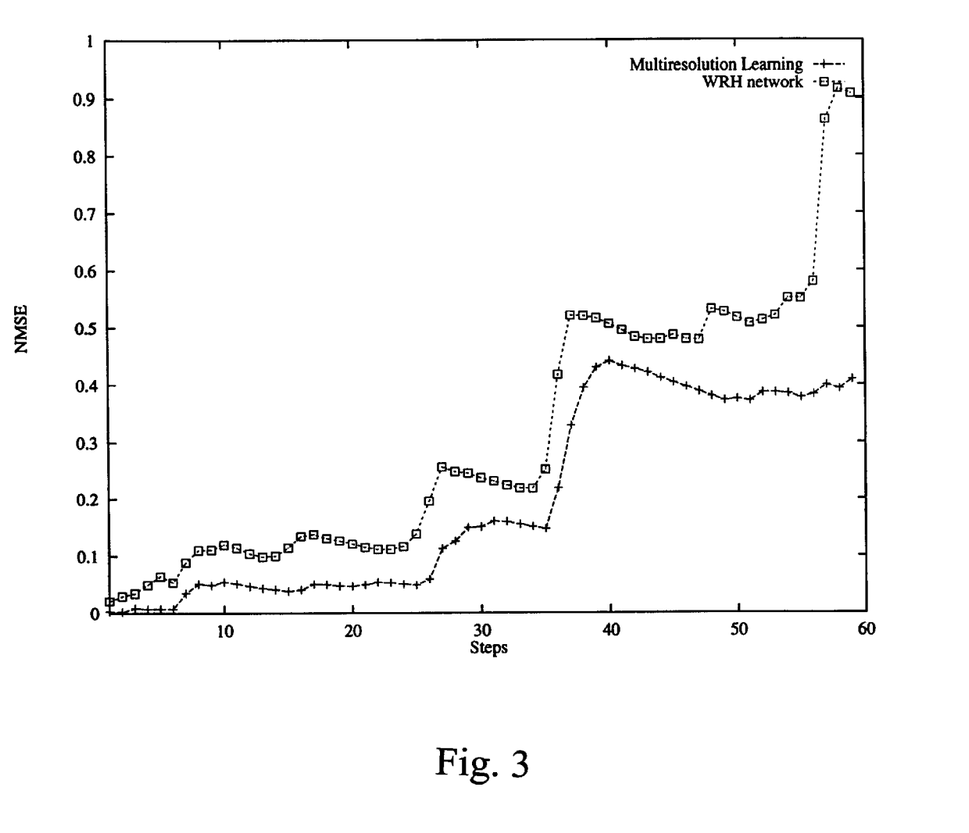
FIG. 3 shows the normalized mean squared error in forecasting for a conventional approach and an embodiment according to the invention with respect to the data shown in FIG. 2.

The results achieved through multiresolution learning compare quite favorably with previously published results relative to iterated multistep forecasting. The NMSE in forecasting for both the Weigend et al. approach (denoted as WRH) and multiresolution learning is shown in FIG. 3. The forecasting error of the network employing multiresolution learning is consistently less than that of the WRH network and is less than half of the NMSE of the WRH network for the first 27 time steps. The improved performance of the neural network employing multiresolution learning implies that it has significantly better generalization ability. Although the comparison in FIG. 3 shows results for one neural network trained using multiresolution learning, numerous trials of multiresolution learning starting with different sets of randomly initialized network weights have yielded comparable results.

High-Speed Network Traffic Prediction

Figure 4:
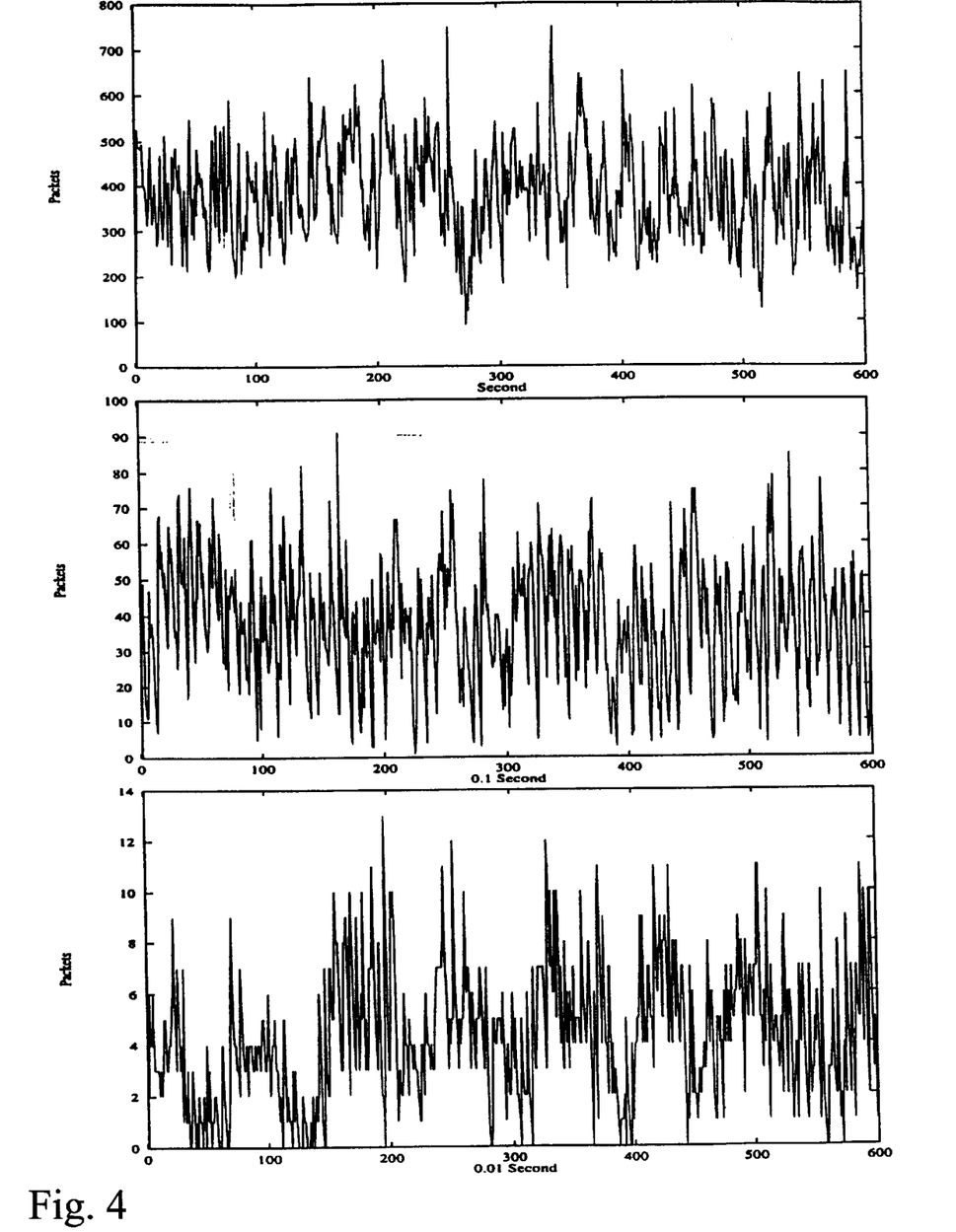
FIG. 4 shows LAN packet counts for three different time scales, used as training data in an embodiment according to the invention.

To further evaluate multiresolution learning, an investigation has been made of high-speed network traffic prediction on real-world Ethernet LAN traffic data (see items xxii, xxiii, and xxiv, above). In FIG. 4, LAN packet counts (i.e., the number of packets per time unit) are shown for three different time scales: 1, 0.1 and 0.01 s. Real-world Ethernet traffic is obviously very complex and irregular, suggesting that it presents a difficult signal prediction problem.

Multiresolution Learning for Ethernet Traffic Series

In the experiments on learning Ethernet traffic series, M is chosen as m−2, and $s^m$, which is the raw traffic data, is decomposed as $$s^m = s^{m-2} + d^{m-2} + d^{m-1} \qquad \text{Equation 19}$$

The Harr wavelet transform was used for the decomposition of $s^m$. Thus, $$r_j = \begin{cases} s^j: & j = m \\ s^j + \sum_{k=j}^{m-1} d^k: & d^k = 0: \quad j = m-2, m-1 \end{cases} \quad \text{Equation 20}$$

Therefore, the multiresolution learning process for the Ethernet traffic was $$A_{m-2}(r_{m-2}) \to A_{m-1}(r_{m-1}) \to A_m(r_m) \quad \text{Equation 21}$$

The backpropagation learning algorithm with learning rate of 0.01 was used for each learning activity. No momentum term was employed.

Experiments

The identical 32-16-4-1 network structure was used for both multiresolution learning and conventional learning, and the Ethernet traffic data on the 1-s time scale was employed. The data set was scaled to the range of $\{-3.0, 3.5\}$. The first 512 data samples were used for training, and the subsequent 16 data samples immediately following the training data were used for evaluating prediction performance. Each learning activity in the multiresolution learning was conducted for 1000 iterations while conventional learning was conducted for 3000 iterations. To achieve a fair comparison, the randomly generated initial weights and the parameters in the backpropagation algorithm were identical for both networks.

Results

The networks resulting from both conventional learning and multiresolution learning were first compared on the basis of their ability to forecast network traffic one step into the future. The NMSE was computed for 16 forecasts beginning with the 513th packet count immediately following the training data. Conventional learning yielded an NMSE of 1.1456, whereas multiresolution learning gave an NMSE of 0.2457. This result demonstrates the difficulty of forecasting real-world, high-speed network traffic.

Figure 5:
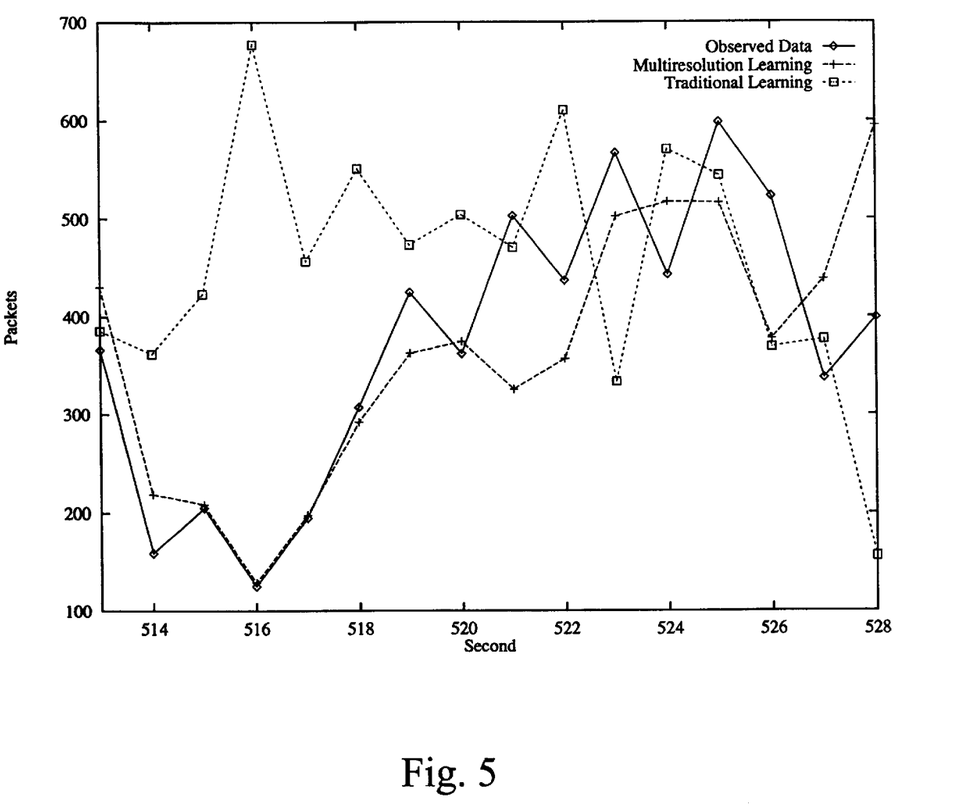
FIG. 5 shows iterated multistep predictions for the training data shown in FIG. 4.
Figure 6:
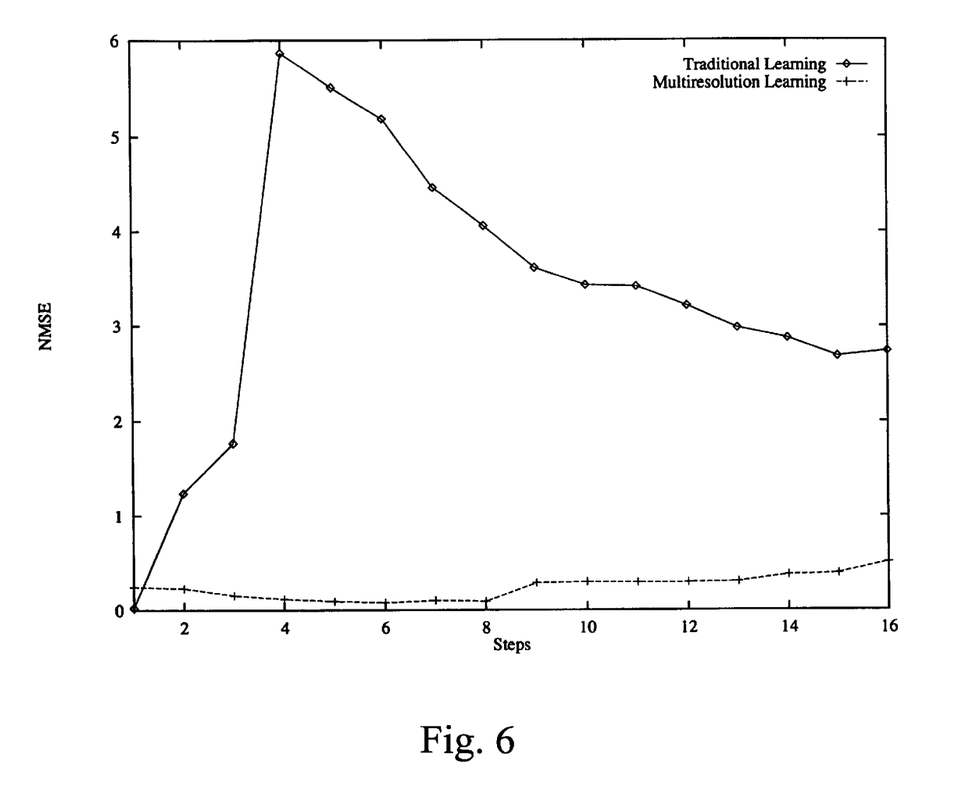
FIG. 6 shows the normalized mean squared error in forecasting for a conventional approach and an embodiment according to the invention with respect to the data shown in FIG. 4.

Iterated multistep prediction studies have been conducted to further explore the power of multiresolution learning. The iterated multistep predictions for the test set are shown in FIG. 5 for both multiresolution and conventional learning. The corresponding iterated multistep prediction NMSE for the test set is shown in FIG. 6. This result indicates that the generalization ability of the neural network was greatly improved by multiresolution learning.

CONCLUSIONS

A naive application of neural network models often fails for difficult, real-world, non-linear, nonstationary signal prediction problems. The currently employed neural network learning process, regardless of the learning algorithm and pre-processing technique used, is basically a single-resolution learning process. The conventional learning process is therefore sometimes inadequate for difficult problems and often yields poor generalization performance. To alleviate the problem of poor generalization, multiresolution learning, which is a new learning paradigm for neural networks, is presented. Based on multiresolution analysis in wavelet theory, multiresolution learning is systematic, mathematically rigorous, and very effective. Additionally, the multiresolution learning paradigm gives neural network designers complete freedom in the choice of the wavelet basis as well as the learning algorithm.

The results on the sunspot series show that prediction performance by the neural network using multiresolution learning is superior to that exhibited by the Wegend et al. neural network, which is considered to be one of the best benchmarks for sunspot series prediction. For complex real-world, high-speed network traffic prediction, the neural network using multiresolution learning appears to perform well enough to be of practical value.

It will be appreciated that the invention is not limited to the sunspot or local area network problems. The invention is applicable where any problem can be formulated as a time series prediction problem. For example, the invention is applicable to predicting values for financial time series (such as stock values or exchange rates) or predicting time series values relating to weather, such as temperature variations related to El Nino.

An important advantage of the invention is its robustness and reliability. In typical neural network solutions, the usefulness of the neural network is highly dependent on the initial weights and on the architecture of the network itself. By training the network according to the methods described above, the values given as the initial weights are not as critical, and the results received when predicting a value are much less dependent on the architecture of the neural network.

In the above examples, the neural network has been trained using the original signal, the finest resolution version of training data, in the learning process as the last learning activity. It is not necessary in the practice of this method of training a neural network to use the original signal. In other words, it is perfectly acceptable to use the approximations based on decomposed wavelet transformations of the original signal for training, and to omit the use of the original signal as a training sequence.

It will be appreciated that this invention may be implemented in different ways. For example, the invention may be implemented in software on a general-purpose computer. Alternatively, the invention may be embodied in software embedded on a chip and even as a pure hardware implementation in analog or digital form.

For simulating the operation of a neural network, there are several commercial tools available, or it is possible for one of skill in the art to write their own neural network simulator.

Computer Systems

One embodiment of this invention thus resides in a computer system. Here, the term "computer system" is to be understood to include at least a memory and a processor. In general, the memory will store, at one time or another, at least portions of an executable program code, and the processor will execute one or more of the instructions included in that executable program code. It will be appreciated that the term "executable program code" and the term "software" mean substantially the same thing as referred to in this description. It is not necessary to the practice of this invention that the memory and the processor be physically located in the same place. That is to say, it is foreseen that the processor and the memory might be in different physical pieces of equipment or even in geographically distinct locations.

Computer Program Products

The above-identified invention may be embodied in a computer program product, as will now be explained.

On a practical level, the software that enables the computer system to perform the operations already described above, may be supplied on any one of a variety of media. Furthermore, the actual implementation of the approach and operations of the invention are typically based on statements written in a programming language. Such programming language statements, when executed by a computer, cause the computer to act in accordance with the particular content of the statements. Furthermore, the software that enables a computer system to act in accordance with the invention may be provided in any number of forms including, but not limited to, original source code, assembly code, object code, machine language, compressed or encrypted versions of the foregoing, and any and all equivalents.

One of skill in the art will appreciate that "media", or "computer-readable media", as used here, may include a diskette, a tape, a compact disc, an integrated circuit, a ROM, a CD, a cartridge, a remote transmission via a communications circuit, or any other similar medium useable by computers. For example, to supply software for enabling a computer system to operate in accordance with the invention, the supplier might provide a diskette or might transmit the software in some form via satellite transmission, via a direct telephone link, or via the Internet. Thus, the term, "computer readable medium" is intended to include all of the foregoing and any other medium by which software may be provided to a computer.

Although the enabling software might be "written on" a diskette, "stored in" an integrated circuit, or "carried over" a communications circuit, it will be appreciated that, for the purposes of this application, the computer usable medium will be referred to as "bearing" the software. Thus, the term "bearing" is intended to encompass the above and all equivalent ways in which software is associated with a computer usable medium.

For the sake of simplicity, therefore, the term "program product" is thus used to refer to a computer useable medium, as defined above, which bears any form of software adapted to enable a computer system to operate according to the above described methods.

Thus, the invention is also embodied in a program product bearing software which enables a computer to perform the training a neural network and its use in predicting a value.

It will also be understood that the software that takes care of successively decomposing an input data stream into an ordered set of wavelet approximations may be referred to as a multiresolution unit, module, or section. Likewise, the software that takes care of training the neural network using the wavelet approximations may be referred to as a training unit, module, or section. Finally, it will be understood that the software that is responsive to a command to output a predicted value may be referred to as a predicting unit, module, or section.

What is claimed is:

1. A method of predicting a value of a series of values, comprising:
   obtaining a plurality of approximations of said signal, each at a different respective resolution, using wavelet transformation;
   successively training a single set of weights of a neural network with said plurality of approximations, in an order based on said respective resolution; and then
   predicting said value using said neural network.

2. The method of predicting as set forth in claim 1, wherein said training is ordered so that a first one of said plurality of approximations used in said training has said respective resolution lower than said respective resolution of a last one of said plurality of approximations used in said training.

3. The method of predicting as set forth in claim 2, wherein said training is ordered so that a second one of said plurality of approximations is used after said first and before said last of said plurality of approximations, and said second one of said plurality of approximations has said respective resolution higher than said first and lower than said last one of said plurality of said approximations.

4. The method of predicting as set forth in claim 2, wherein said training further comprises training said neural network with said signal after said last of said plurality of approximations.

5. A method of training a neural network, comprising:
   successively decomposing an input data stream into an ordered set of wavelet approximations of progressively lower resolutions;
   training a single set of weights of said neural network using more than one of said ordered set of wavelet approximations, in an order of use from lower resolution to higher resolution.

6. A neural network system, comprising:
   a multiresolution unit for decomposing an input signal into plural training segments of differing resolutions; and
   a training unit for successively training a single set of weights of a neural network using said plural training segments.

7. The neural network system as set forth in claim 6, wherein said training unit trains said neural network by acting on said plural training segments in an ordered sequence.

8. The neural network system as set forth in claim 7, wherein said ordered sequence for said plural training segments is from lower training segment resolution to higher training segment resolution.

9. The neural network system as set forth in claim 8, wherein said training unit trains said neural network with said input signal after acting on said plural training segments in said ordered sequence.

10. The neural network system as set forth in claim 6, wherein at least one of said training unit, said multiresolution unit, and said neural network is implemented completely in hardware.

11. A computer system adapted to provide a trained neural network, comprising:
   a processor, and
   a memory including software instructions adapted to enable the computer system to perform the steps of:
      successively decomposing an input data stream into an ordered set of wavelet approximations of progressively lower resolutions; and
      training a single set of weights of said neural network using more than one of said ordered set of wavelet approximations, in an order of use from lower resolution to higher resolution.

12. The computer system adapted to provide a trained neural network as set forth in claim 11, wherein said memory further includes software instructions adapted to enable the computer system to train said neural network using said input data stream.

13. A program product, comprising:
   software instructions, and
   a computer readable medium bearing said software instructions;
   wherein said software instructions are adapted to enable a computer system to perform the steps of:
      successively decomposing an input data stream into an ordered set of wavelet approximations of progressively lower resolutions; and train a single set of weights of said neural network using more than one of said ordered set of wavelet approximations, in an order of use from lower resolution to higher resolution.

14. The program product as set forth in claim 13, wherein said steps further comprise training said neural network using said input data stream.

15. A program product, comprising:

a trained neural network, and a computer readable medium bearing said trained neural network;

wherein said trained neural network comprises a neural network having a single set of weights trained with an ordered set of approximations, said order being from lower resolution to higher resolution.

* * * * *